(12) United States Patent
Li et al.

(10) Patent No.: US 10,320,705 B1
(45) Date of Patent: Jun. 11, 2019

(54) IDENTIFYING VIDEO DATA INCLUDED IN NETWORK PACKETS

(71) Applicant: Verizon Patent and Licensing Inc., Basking Ridge, NJ (US)

(72) Inventors: Feng Li, Lexington, MA (US); Jae Won Chung, Lexington, MA (US); Anil Vayaal, Westford, MA (US); Vijay Nanjundan, Hillsborough, NJ (US); Mark Lawrence Claypool, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/909,478

(22) Filed: Mar. 1, 2018

Related U.S. Application Data

(60) Provisional application No. 62/636,631, filed on Feb. 28, 2018.

(51) Int. Cl.
| | |
|---|---|
| *H04L 29/06* | (2006.01) |
| *H04L 29/08* | (2006.01) |
| *H04W 80/12* | (2009.01) |
| *H04L 12/851* | (2013.01) |
| *H04L 12/927* | (2013.01) |

(52) U.S. Cl.
CPC ........ *H04L 47/803* (2013.01); *H04L 47/2441* (2013.01); *H04L 69/164* (2013.01); *H04L 69/329* (2013.01); *H04W 80/12* (2013.01)

(58) Field of Classification Search
CPC . H04L 47/803; H04L 47/2441; H04L 69/164; H04L 69/329; H04W 80/12
See application file for complete search history.

(56) References Cited

U.S. PATENT DOCUMENTS

| | | | | |
|---|---|---|---|---|
| 8,102,878 | B2* | 1/2012 | Lee | H04L 1/0007 370/468 |
| 8,548,048 | B2* | 10/2013 | El-Maleh | H04N 21/23406 375/240.05 |
| 2007/0071030 | A1* | 3/2007 | Lee | H04L 1/0007 370/468 |
| 2007/0097257 | A1* | 5/2007 | El-Maleh | H04N 21/23406 348/419.1 |
| 2007/0147371 | A1* | 6/2007 | Radha | H04L 1/0057 370/390 |
| 2008/0084933 | A1* | 4/2008 | Lee | H04N 7/147 375/240.26 |

\* cited by examiner

*Primary Examiner* — Kashif Siddiqui

(57) ABSTRACT

A device can identify video data included in network packets. For example, the device can identify a flow of network packets, the flow including uplink packets downlink packets. The device can determine that the flow includes at least one application data unit (ADU), each ADU including an uplink packet and multiple downlink packets. The device can determine that the at least one ADU includes video data based on determining that a throughput of the at least one ADU meets a throughput threshold, a an average payload size of the downlink packets included in the at least one ADU meets a size threshold, and a count of ADUs included in the at least one ADU meets a count threshold. Based on the at least one ADU including the video data, the device can perform an action.

20 Claims, 5 Drawing Sheets

IDENTIFYING VIDEO DATA INCLUDED IN NETWORK PACKETS

BACKGROUND

This application claims the benefit of U.S. Provisional Application No. 62/636,631, filed Feb. 28, 2018, which is incorporated herein by reference.

BACKGROUND

Video data (e.g., data used to enable computing devices to play video content) often accounts for a significant portion of network traffic handled by various networks, including local networks, enterprise networks, Internet service provider networks, and/or the like.

DETAILED DESCRIPTION OF PREFERRED EMBODIMENTS

Figure 1A:
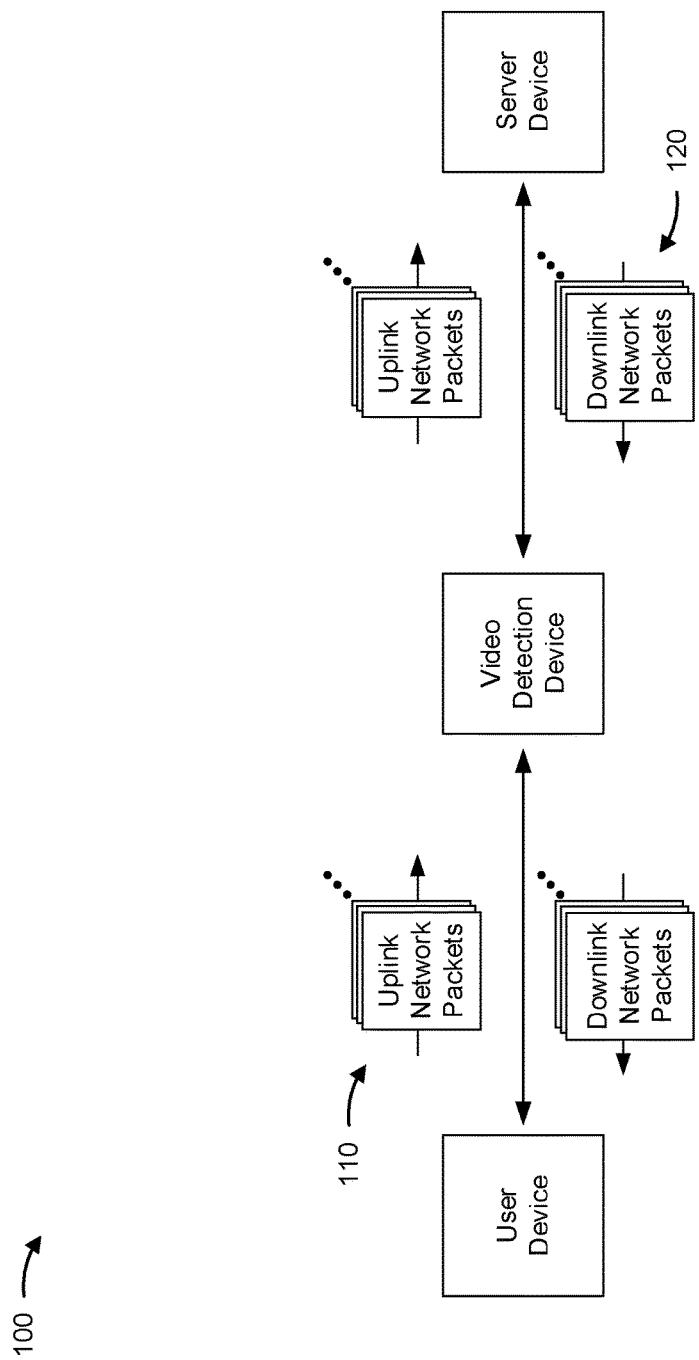
FIG. 1A is a diagram of an overview of an example implementation described herein.

The following detailed description of example implementations refers to the accompanying drawings. The same reference numbers in different drawings can identify the same or similar elements.

Entities associated with communications networks often identify different types of network traffic (e.g., network traffic including video data, audio data, file data, hypertext transfer protocol (HTTP) data, and/or the like) for a variety of purposes. However, it can be difficult to identify which type of content is included some types of network traffic. For example, content included in encrypted network traffic can be difficult to identify using packet inspection methods. In addition, due to numerous network transfer protocols capable of being used for network communications, and the variety of different types of content capable of being communicated, statistics-based and/or machine learning-based content identification methods are often difficult to implement, subject to false positives and/or low accuracy, and/or resource intensive to operate.

Some implementations described herein provide a video detection device capable of identifying video data included in network packets. For example, the video detection device can identify a flow of network packets between devices (e.g., between a user device and a server computer), and determine that the flow includes application data units (ADUs, e.g., network packets associated with a particular application, service, and/or the like). The video detection device can determine that the flow includes an ADU, for example, by determining that a payload of an uplink network packet (e.g., packets sent from a user device to a server computer) included in the flow meets a threshold uplink payload size; and determining that a payload size of multiple downlink network packets included in the flow meets a threshold downlink payload size.

After determining that the flow includes one or more ADUs, the video detection device can determine whether the ADUs include video data. The determination that the ADUs include video data can be made, for example, based on information related to the ADUs. By way of example, the video detection device can determine that a measure of throughput associated with the ADUs meets a throughput threshold, an average ADU downlink payload size meets a size threshold, a count of the number of ADUs meets an ADU count threshold, and/or the like. Based on the foregoing thresholds and determinations, the video detection device can determine that the flow of network packets includes video data and take action based on that determination. Example actions can include shaping the network flow, notifying a third party regarding the determination, performing load balancing, storing information related to the determination, and/or the like.

In this way, a video detection device can identify video content included in a variety of different types of network traffic, including encrypted network traffic and network traffic transmitted using a variety of different types of network transfer protocols. The ability to determine that network traffic includes video data can facilitate the performance of a variety of actions, such as network traffic shaping, network traffic statistics measuring, network traffic analytics, load balancing, and/or the like. In addition, the operations performed by the video detection device consumes relatively few computing resources (e.g., processing resources, memory resources, and/or the like), compared to other methods for identifying video content in network traffic.

The following detailed description of example implementations refers to the accompanying drawings. The same reference numbers in different drawings can identify the same or similar elements.

FIG. 1A is a diagram of an overview of an example implementation 100 described herein. As shown in FIG. 1A, example implementation 100 can include a user device (e.g., a mobile phone, tablet computer, laptop computer, desktop computer, and/or the like), a video detection device (e.g., a networking and/or computing device, such as a router, switch gateway, server computer, and/or the like), and a server device (e.g., a web server, application server, and/or the like).

As shown in FIG. 1A, and by reference number 110, the user device transmits network packets, which are referred to as uplink network packets when they are transmitted from the user device. The video detection device receives the uplink network packets and forwards them to the server device. For example, the video detection device can operate on a network (e.g., a local area network, wide area network, service provider network, enterprise network, and/or the like) and be responsible for forwarding network traffic between devices that communicate using the network.

As further shown in FIG. 1A, and by reference number 120, the server device transmits network packets, which are referred to as downlink network packets when they are transmitted to the user device. As with the uplink network packets, the video detection device receives the downlink network packets and forwards them to the user device. While only a single user device and a single server device are depicted in example implementation 100, in some implementations video detection device can handle network traffic for many user devices and/or server devices.

Figure 1B:
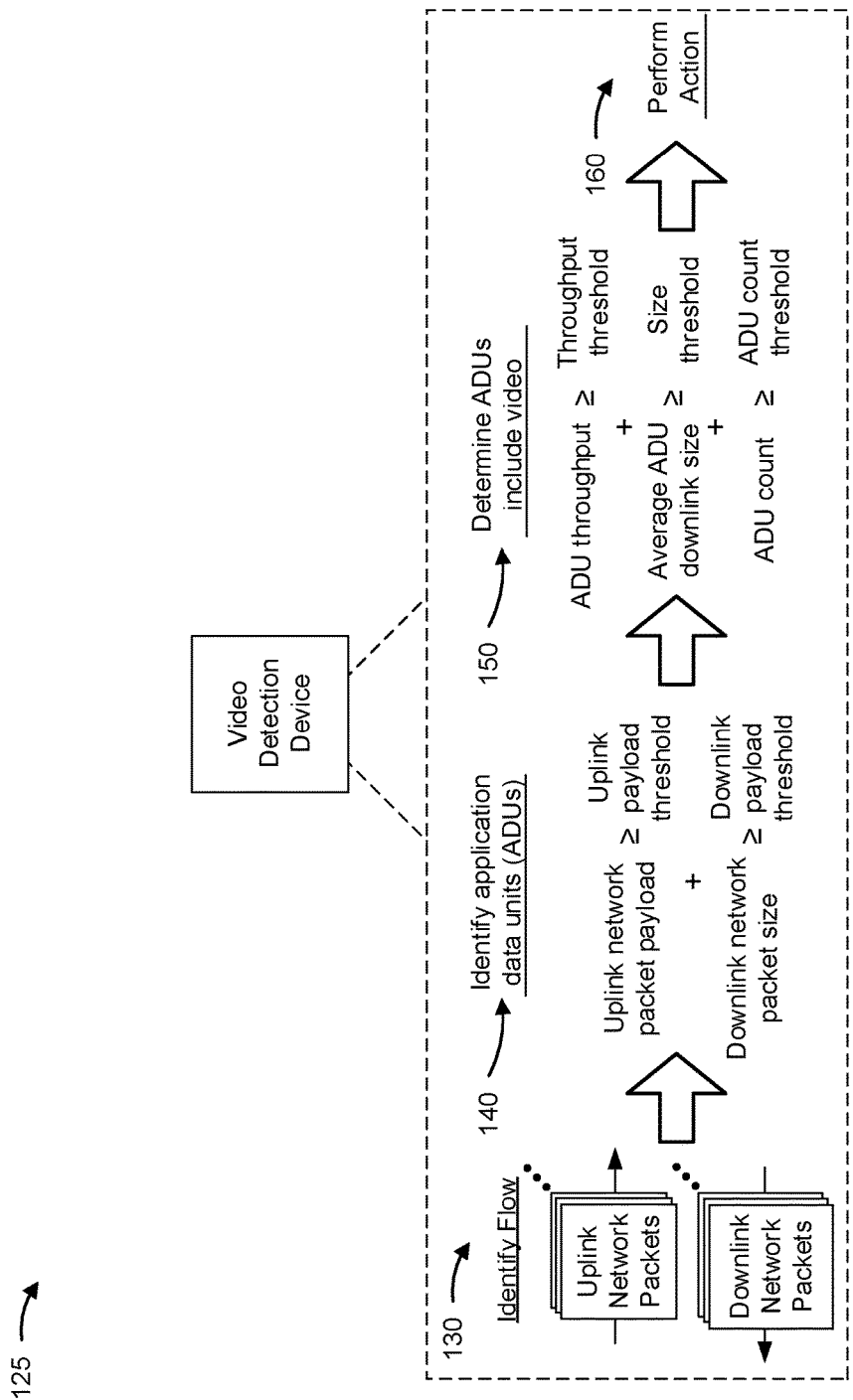
FIG. 1B is a diagram of an overview of another example implementation described herein.

FIG. 1B is a diagram of an overview of an example implementation 125 described herein. As shown in FIG. 1B, example implementation 125 can include a video detection device.

As shown in FIG. 1B, and by reference number 130, the video detection device identifies a network flow based on the network packets that were transmitted between the user device and the server device (e.g., as shown in FIG. 1A). A network flow is a set of network packets that passes an observation point in a network during a certain time interval. The network flow can include, for example, a set network packets sent from a source (e.g., a user device and/or server device) to a particular unicast, anycast, and/or multicast destination. A network flow can also include all of the network packets included in a specific transport connection, media steam, and/or the like. In some implementations, a network flow can be a host-to-host communication path, or a socket-to-socket communication identified by a unique combination of source and destination network addresses and port numbers, together with a transport protocol (e.g., a user datagram protocol (UDP) or a transmission control protocol (TCP)). In the TCP case, a flow can be a virtual circuit, also known as a virtual connection or a byte stream. Other methods for identifying a network flow can also be used. In example implementation 125, the identified network flow includes multiple uplink network packets (e.g., transmitted from user device to server device) and multiple downlink network packets (e.g., transmitted from server device to user device).

As further shown in FIG. 1B, and by reference number 140, the video detection device identifies one or more application data units (ADUs) included in the network flow. An ADU includes an uplink network packet and multiple downlink network packets. By way of example, the user device can transmit an uplink packet that includes a request for content, the content being provided by the server device. The server device can provide, in response to the request, multiple downlink network packets, which can include the requested content. The video detection device can determine that the network flow between user device and server device includes an ADU, for example, by making two determinations: first, that an uplink network packet includes a payload with a size that meets an uplink payload size threshold, and second, that a cumulative size of the payloads included in downlink network packets meets a downlink payload threshold. In this situation, an ADU can be defined to include an uplink network packet paired with multiple downlink packets, where the payload of the uplink packet meets a first threshold size, and the combined downlink packet payloads meets a second threshold size. In the video content identification context, identifying an ADU can be useful, for example, to detect video content in situations where a user device can send a single uplink network packet that includes a request for video content, and the server device responds with multiple downlink network packets that include the video content.

As further shown in FIG. 1B, and by reference number 150, the video detection device determines that the ADUs identified in the network flow include video content. The determination that the ADUs include video content is based on information regarding the ADUs included in the network flow. For example, the determination can be based on a measure of ADU throughput (e.g., the rate at which data was transmitted in the identified ADUs), an average ADU downlink payload size (e.g., the average size of the payloads included in the downlink packets of the ADUs), a number of ADUs included in the network flow, and/or the like. Using the foregoing information regarding the ADUs included in the network flow, the video detection device can determine whether the ADUs of the network flow include video content, for example, by making three determinations: first, that the measure of ADU throughput meets an ADU throughput threshold; second, that the average downlink payload size meets an ADU size threshold; and third, that the number of ADUs included in the network flow meets an ADU count threshold. In a situation where the ADUs included in the network flow meet the foregoing thresholds, the video detection device can determine that the network flow includes video data.

As further shown in FIG. 1B, and by reference number 160, the video detection device can perform an action. For example, based on the determination that the network flow includes video content, the video detection device can shape the network flow (e.g., assign or adjust a quality of service associated with the network flow, forward and/or route the network flow in a particular manner, perform load balancing, and/or the like). As another example, the video detection device can log information regarding the network flow, which can facilitate a variety of functions, including analytics, troubleshooting, and/or the like. Additionally, or alternatively, the video detection device can provide information identifying the network flow as a network flow that includes video content to another device (e.g., a third party device capable of performing a variety of actions, such as analytics, tracking, logging, and/or the like). Other actions can also be performed based on the network flow including video data.

In this way, the video detection device can identify video content included in a variety of different types of network traffic, including encrypted network traffic and network traffic transmitted using a variety of different types of network transfer protocols. The ability to determine that network traffic includes video data can facilitate the performance of a variety of actions, such as network traffic shaping, network traffic statistics measuring, network traffic analytics, load balancing, and/or the like. In addition, the operations performed by the video detection device consumes relatively few computing resources (e.g., processing resources, memory resources, and/or the like), compared to other methods for identifying video content in network traffic.

As indicated above, FIGS. 1A and 1B are provided merely as examples. Other examples are possible and can differ from what was described with regard to FIGS. 1A and 1B.

Figure 2:
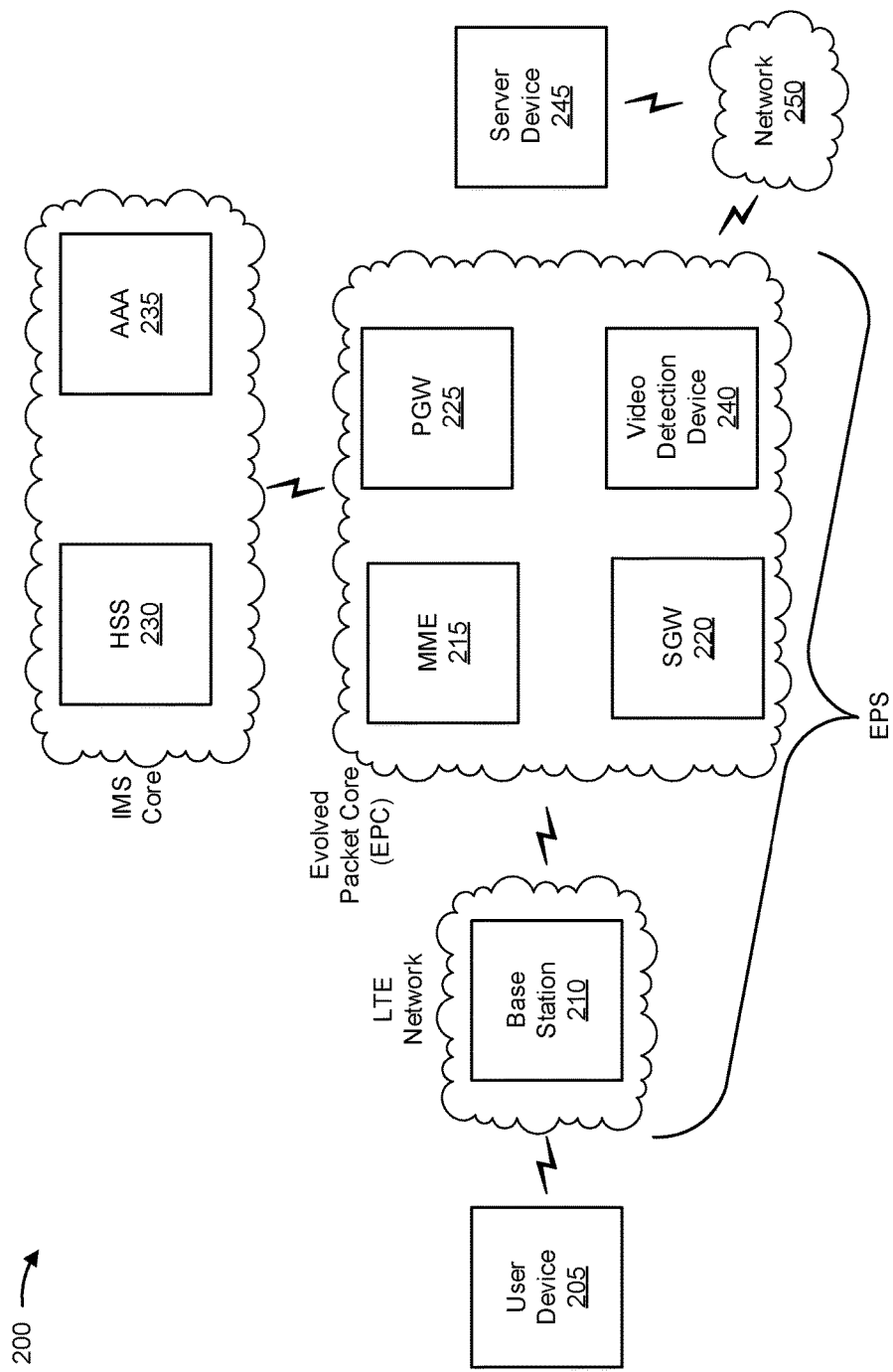
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; a video detection device 240; a server device 245; and a network 250. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a third generation (3G) network.

Environment 200 can include an evolved packet system (EPS) that includes an LTE network and/or an evolved packet core (EPC) that operate based on a third generation partnership project (3GPP) wireless communication standard. The LTE network can include a radio access network (RAN) that includes one or more base stations 210 that take the form of evolved Node Bs (eNBs) via which user device 205 communicates with the EPC. The EPC can include MME 215, SGW 220, PGW 225, and/or video detection device 240 that enable user device 205 to communicate with network 250 and/or an Internet protocol (IP) multimedia subsystem (IMS) core. The IMS core can include HSS 230 and/or AAA 235, and can manage device registration and authentication, session initiation, etc., associated with user devices 205. HSS 230 and/or AAA 235 can reside in the EPC and/or the IMS core.

User device 205 can include one or more devices capable of communicating with base station 210 and/or a network (e.g., network 250). For example, user device 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, a wearable device, and/or a similar device. User device 205 can send traffic to and/or receive traffic from server 245 and/or network 250 (e.g., via base station 210, SGW 220, PGW 225, and/or video detection device 240).

Base station 210 can include one or more devices capable of transferring traffic, such as audio, video, text, and/or other traffic, destined for and/or received from user device 205. In some implementations, base station 210 can include an eNB associated with the LTE network that receives traffic from and/or sends traffic to network 250 via SGW 220 and/or PGW 225. Additionally, or alternatively, one or more base stations 210 can be associated with a RAN that is not associated with the LTE network. Base station 210 can send traffic to and/or receive traffic from user device 205 via an air interface. In some implementations, base station 210 can include a small cell base station, such as a base station of a microcell, a picocell, and/or a femtocell.

MME 215 can include one or more devices, such as one or more server devices, capable of managing authentication, activation, deactivation, and/or mobility functions associated with user device 205. In some implementations, MME 215 can perform operations relating to authentication of user device 205. Additionally, or alternatively, MME 215 can facilitate the selection of a particular SGW 220 and/or a particular PGW 225 to serve traffic to and/or from user device 205. MME 215 can perform operations associated with handing off user device 205 from a first base station 210 to a second base station 210 when user device 205 is transitioning from a first cell associated with the first base station 210 to a second cell associated with the second base station 210. Additionally, or alternatively, MME 215 can select another MME (not pictured), to which user device 205 should be handed off (e.g., when user device 205 moves out of range of MME 215).

SGW 220 can include one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 250 (e.g., via PGW 225) and/or other network devices associated with the EPC and/or the IMS core. SGW 220 can also receive traffic from network 250 and/or other network devices, and can send the received traffic to user device 205 via base station 210. Additionally, or alternatively, SGW 220 can perform operations associated with handing off user device 205 to and/or from an LTE network.

PGW 225 can include one or more devices capable of providing connectivity for user device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 250. Additionally, or alternatively, PGW 225 can receive traffic from network 250, and can send the traffic to user device 205 via SGW 220 and base station 210. PGW 225 can record data usage information (e.g., byte usage), and can provide the data usage information to AAA 235.

HSS 230 can include one or more devices, such as one or more server devices, capable of managing (e.g., receiving, generating, storing, processing, and/or providing) information associated with user device 205. For example, HSS 230 can manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices.

AAA 235 can include one or more devices, such as one or more server devices, that perform authentication, authorization, and/or accounting operations for communication sessions associated with user device 205. For example, AAA 235 can perform authentication operations for user device 205 and/or a user of user device 205 (e.g., using one or more credentials), can control access, by user device 205, to a service and/or an application (e.g., based on one or more restrictions, such as time-of-day restrictions, location restrictions, single or multiple access restrictions, read/write restrictions, etc.), can track resources consumed by user device 205 (e.g., a quantity of voice minutes consumed, a quantity of data consumed, etc.), and/or can perform similar operations.

Video detection device 240 includes one or more devices, such as one or more devices capable of forwarding packets, routing packets, processing packets, and/or the like, and further capable of identifying video data included in a network flow. For example, video detection device 240 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, video detection device 240 can handle network traffic as it is transmitted. In some implementations, video detection device 240 can observe network traffic after it has been transmitted (e.g., by analyzing logs). While depicted as being included in the EPC, in some implementations, video detection device 240 can be external to the EPC (e.g., included in the IMS core, associated with the base station, or in communication with the EPS via network 250. In some implementations, the video detection device 240 can be included in another device, such as SGW 220, PGW 225, an edge router, and/or the like.

Server device 245 includes one or more devices capable of storing, processing, and/or routing information associated with content, such as video content. In some implementations, server device 245 can include a communication interface that allows server device 245 to receive information from and/or transmit information to other devices in environment 200. In some implementations, server device 245 can include a web server, an application server, and/or the like, which is capable of providing video content to user device 205 via network 250 and other devices included in environment 200.

Network 250 can include one or more wired and/or wireless networks. For example, network 250 can include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
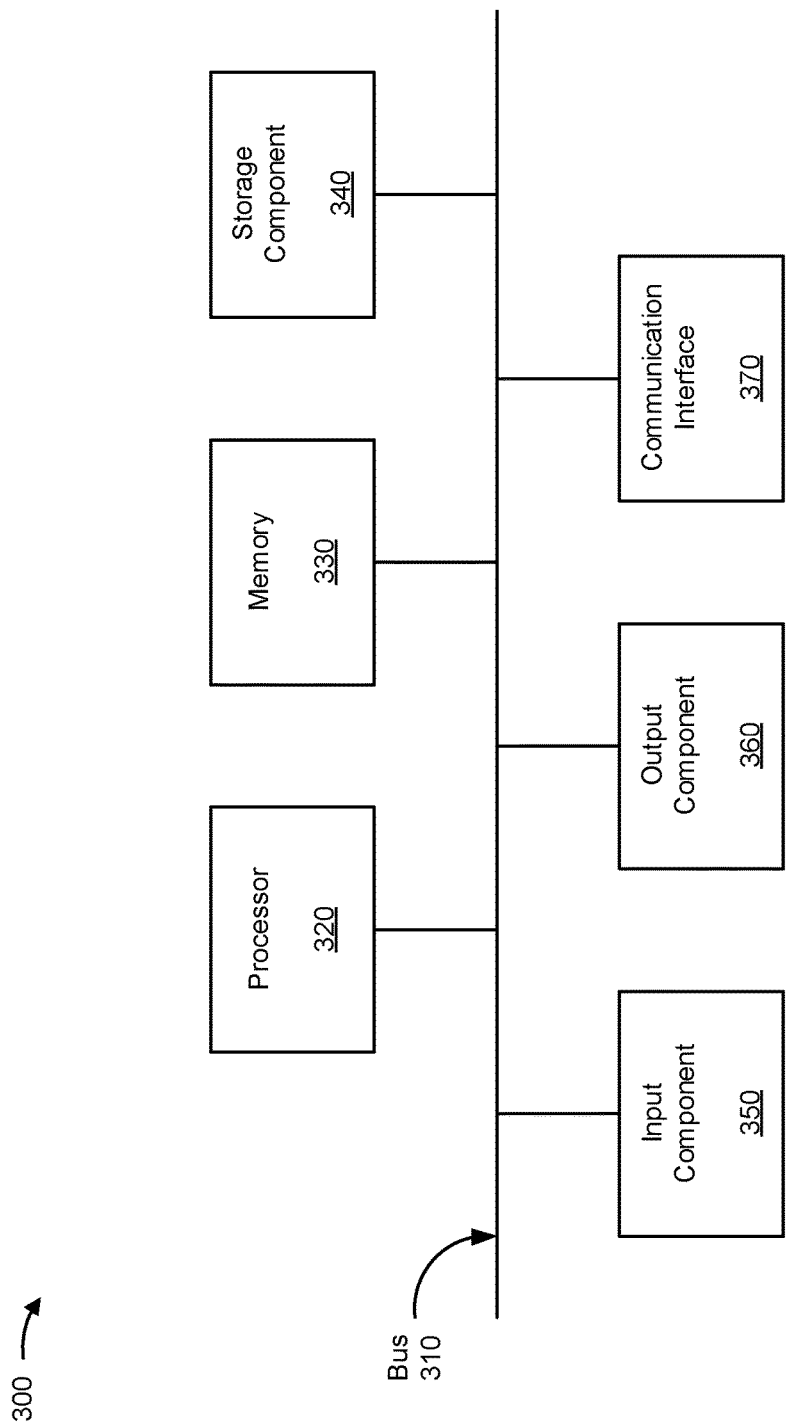
FIG. 3 is a diagram of example components of one or more devices of FIG. 2.

FIG. 3 is a diagram of example components of a device 300. Device 300 can correspond to user device 205, base station 210, MME 215, SGW 220, PGW 225, HSS 230, AAA 235, video detection device 240, and/or server device 245. In some implementations user device 205, base station 210, MME 215, SGW 220, PGW 225, HSS 230, AAA 235, video detection device 240, and/or server device 245 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
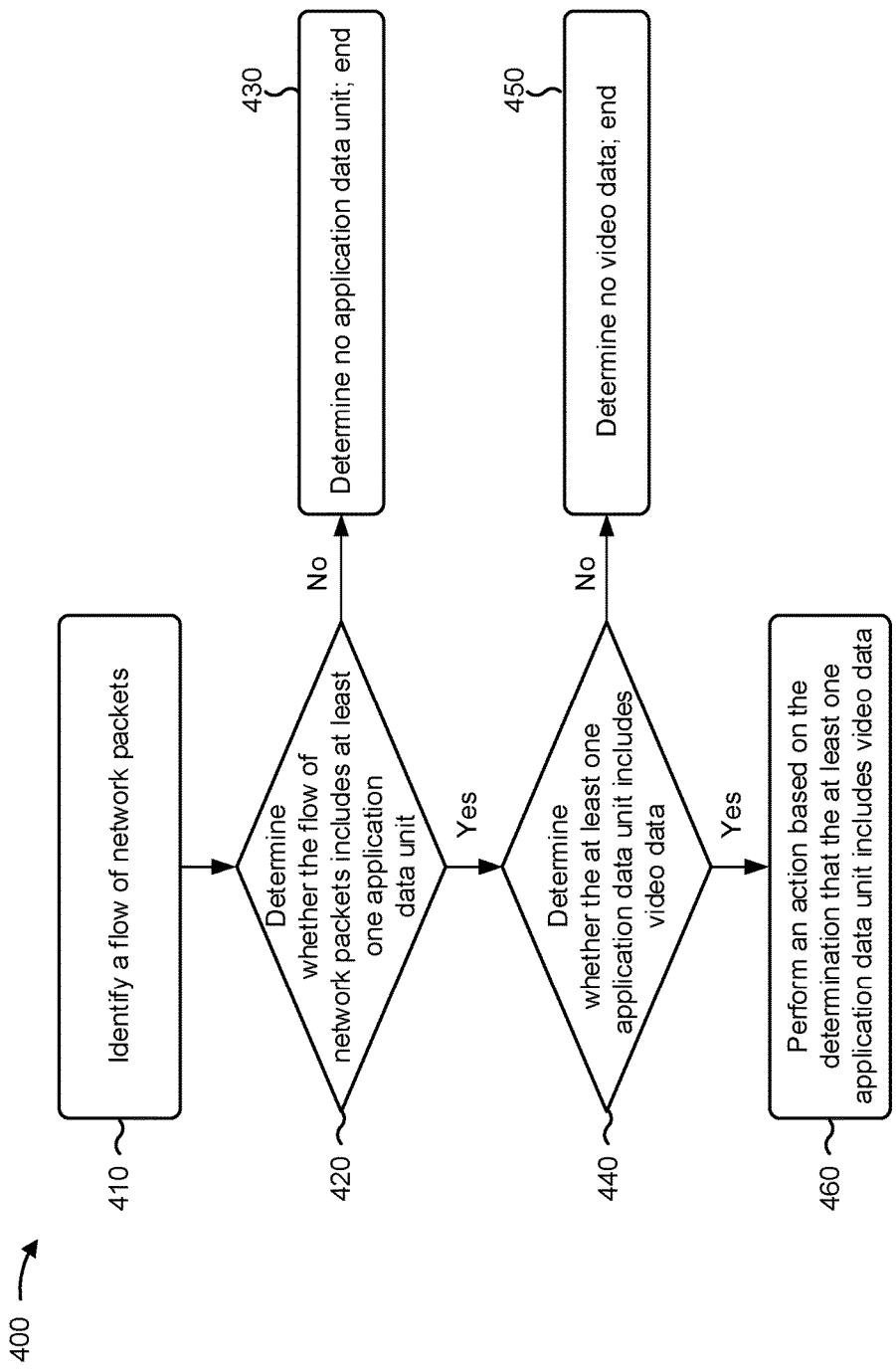
FIG. 4 is a flow chart of an example process for identifying video data included in network packets.

FIG. 4 is a flow chart of an example process 400 for identifying video data included in network packets. In some implementations, one or more process blocks of FIG. 4 can be performed by video detection device 240. In some implementations, one or more process blocks of FIG. 4 can be performed by another device or a group of devices separate from or including video detection device 240, such as user device 205, base station 210, MME 215, SGW 220, PGW 225, HSS 230, AAA 235, and/or server device 245.

As shown in FIG. 4, process 400 can include identifying a flow of network packets (block 410). For example, video detection device 240 (e.g., using processor 320, input component 350, output component 360, and/or the like) can identify a flow of network packets between user device 205 and server device 245. In some implementations, the flow can be identified as the network packets are being handled (e.g., processed, forwarded, routed, and/or the like) by video detection device 240. In some implementations, the flow can be identified after the network packets have been transmitted, e.g., by analyzing network communications logs stored in local or remote storage.

A flow of network packets can be identified in a variety of ways. For example, video detection device 240 can identify a flow as host-to-host or socket-to-socket communications identified by source and destination network addresses, port numbers, and/or transport protocol. In some implementations, a flow can be identified based on tags, such as virtual LAN tagging in Ethernet networks, or by a Label Switched Path in Multiprotocol Label Switching (MPLS) tag switching. Other methods can also be used to identify a flow of network packets.

The flow of network packets includes uplink network packets and downlink network packets. The uplink network packets can be identified as uplink packets, for example, based on their source (e.g., user device 205) and/or destination (e.g., server device 245). The downlink network packets can be identified as downlink packets based on their destination (e.g., user device 205) and/or source (e.g., server device 245).

In this way, video detection device 240 can identify a flow of network packets, enabling video detection device 240 to perform a variety of operations, e.g., in a manner designed to determine whether video data is included in the flow of network packets.

As further shown in FIG. 4, process 400 can include determining whether the flow of network packets includes at least one application data unit (block 420). For example, video detection device 240 (e.g., using processor 320, input component 350, output component 360, and/or the like) can determine whether the flow of network packets includes at least one ADU. An ADU can include, for example, network packets associated with a particular application, service, and/or the like. In the video content identification context, video detection device 240 can identify an ADU as a set of network packets that includes an uplink packet (e.g., a request for content from server device 245) and multiple downlink packets (e.g., content data provided by server device 245 in response to the request included in the uplink packet). In this example, an ADU can include a series of packets defined by a repeating pattern of one uplink packet, followed by multiple downlink packets (e.g., as in a situation where user device 205 includes an application for buffering video content and obtains video data from server device 245 through periodic requests, where each request is followed by a series of downlink packets that include the requested video data).

In some implementations, video detection device 240 can determine whether the flow of network packets includes at least one ADU by determining whether an uplink packet included in the flow includes a payload with a size that meets an uplink payload size threshold. In this situation, whether the flow includes an ADU depends on the payload size of the uplink packet being large enough to include a request for content, such as a request for video content. By way of example, the uplink payload size threshold can be 500 bytes. In a situation where the payload size of an uplink packet included in the flow meets or exceeds 500 bytes, it can indicate that the flow includes an ADU.

In some implementations, video detection device 240 can determine whether the flow of network packets includes at least one ADU by determining whether a cumulative size of the payloads included in downlink packets of the flow meets a downlink payload threshold. In this situation, whether the flow includes an ADU depends on the payload sizes of the downlink packets sent in response to the uplink packet (e.g., the uplink packet that meets the uplink payload size threshold). The size of the payloads included in the downlink packets can provide an indication that the downlink packets include content data, such as video data. By way of example, the downlink payload threshold can be 100 kilobytes (KB). In a situation where the cumulative payloads of downlink packets included in the flow meets or exceeds 100 KB, it can indicate that the flow includes an ADU.

In some implementations, video detection device 240 can determine whether the flow of network packets includes at least one ADU based on either one or both of the foregoing determinations. For example, video detection device 240 can determine that an ADU is included in a flow based on i) the payload size of an uplink packet meeting the uplink payload size threshold, and ii) the cumulative payloads of downlink packets meeting the downlink payload threshold. The manner in which video detection device 240 determines whether the flow includes an ADU does not require packet inspection and, accordingly, can work on encrypted network traffic and network traffic transmitted using a variety of different protocols, including a Quick UDP Internet Connections (QUIC) protocol.

In this way, video detection device 240 can determine whether the flow of network packets includes at least one ADU, which can enable video detection device 240 to determine whether the ADUs included in the flow include video content.

As further shown in FIG. 4, process 400 can include determining that the flow of network packets does not include at least one application data unit, and process 400 can end (block 430-NO). For example, by determining that the flow of network packets does not include at least one ADU, video detection device 240 (e.g., using processor 320, input component 350, output component 360, and/or the like) can determine that no video content is included in the flow, and end process 400. In some implementations, process 400 might not end at block 430, and video detection device 240 can perform an action based on the determination, such as identifying the flow as a non-video flow. Additional actions that can be performed by video detection device 240 are described in further detail with respect to block 460, below.

As further shown in FIG. 4, process 400 can include determining whether the at least one application data unit includes video data (block 440). For example, video detection device 240 (e.g., using processor 320, input component 350, output component 360, and/or the like) can determine whether the identified ADUs include video data. Video data can include, for example, data designed to cause presentation of video content, e.g., at user device 205. By way of example, video data can include a segment of video content designed to be presented on user device 205, e.g., using an application designed to play video content. The determination that the ADUs include video data can be made based on information associated with the ADUs.

In some implementations, video detection device 240 can determine whether the ADUs include video data by determining whether a measure of ADU throughput (e.g., the rate at which data was transmitted in the identified ADUs of the flow) meets an ADU throughput threshold. Video detection device 240 can obtain the measure of ADU throughput, for example, by dividing the cumulative size of the payloads of the downlink packets included in the ADU by a unit of time (e.g., in a situation where the downlink packets included in an ADU include a cumulative payload of 600 KB transmitted over two seconds, the measure of ADU throughput is 300 KB per second (Kbps)). By way of example, the ADU throughput threshold for video content can be 300 Kbps, and video detection device 240 can determine that the ADU includes video content based on the measure of ADU throughput meeting or exceeding 300 Kbps. In the context of video detection, ADU throughput less than the ADU throughput threshold can be too low to be identified as including video data, as video data transmission tends to involve relatively high throughput.

In some implementations, video detection device 240 can determine whether the ADUs include video data by determining whether an average ADU downlink payload size (e.g., the average size of the payloads included in the downlink packets of an ADU) meets an ADU size threshold. Video detection device 240 can obtain the average ADU downlink payload size, for example, by dividing the cumulative size of the payloads of the downlink packets included in the ADU by the number of downlink packets included in the ADU (e.g., in a situation where the downlink packets included in an ADU include a cumulative payload of 1,000 KB transmitted over 1,000 downlink packets, the average ADU downlink payload size is 1 KB). By way of example, the ADU size threshold for video content can be 900 bytes (B), and video detection device 240 can determine that the ADU includes video content based on the average ADU downlink payload size meeting or exceeding 900 B. In the context of video detection, average payload size below the ADU size threshold can be too small to be identified as including video data, as downlink packets that include video data tend to be relatively large compared to other types of content.

In some implementations, video detection device 240 can determine whether the ADUs include video data by determining whether a number of ADUs included in the flow of network packets meets an ADU count threshold. Video detection device 240 can obtain the number of ADUs included in the flow by counting ADUs (e.g., counting ADUs determined to be included in the flow at block 420). By way of example, the ADU count threshold for video content can be three ADUs, and video detection device 240 can determine that the flow includes video content based on the number of ADUs included in the flow of network packets meeting or exceeding three ADUs. In the context of video detection, transmission of video data tends to occur across multiple ADUs (e.g., as in a situation where video content is buffered, and user device 205 periodically requests/receives portions of video content in ADUs), and flows that only include one or two ADUs cannot include enough ADUs to be considered video content.

In some implementations, video detection device 240 can determine whether the ADUs include video data based on any combination of the foregoing determinations. For example, video detection device 240 can determine that the ADUs included in a flow include video content based on a measure of ADU throughput meeting an ADU throughput threshold, an average ADU downlink payload size meeting an ADU size threshold, and a number of ADUs included in the flow of network packets meeting an ADU count threshold. In the foregoing example, video detection device 240 can only identify a flow as including video content based on all three thresholds being met.

In some implementations, video detection device 240 can make other determinations regarding the flow of network packets based on thresholds the same as or similar to the example thresholds above. For example, video detection device 240 can determine that the flow does not include video data, or that the flow might include video data, based on one or more thresholds. By way of example, video detection device 240 can use multiple ADU throughput thresholds to determine that the ADUs included in the flow might include video data, or that they do not include video data. For example, video detection device 240 can identify a flow as a flow that might include video data in a situation where the measure of ADU throughput meets a threshold of 192 Kbps, but does not met a threshold of 300 Kbps. Using the foregoing example thresholds, video detection device 240 can determine that the flow does not include video data in a situation where the measure of ADU throughput does not meet the lower threshold of 192 Kbps. The ability to determine that a flow might include video content can facilitate a variety of functions, and the performance of a variety of actions, such as those described in further detail below with respect to block 460.

In this way, video detection device 240 can determine whether the ADUs include video data, which can enable video detection device 240 to perform a variety of actions. As with the determination of whether the flow includes at least one ADU, the manner in which video detection device 240 determines whether the ADUs include video data does not require packet inspection and, accordingly, can work on encrypted network traffic and network traffic transmitted using a variety of different protocols.

As further shown in FIG. 4, process 400 can include determining that the ADUs do not include video data, and process 400 can end (block 450-NO). For example, by determining that the ADUs do not include video data, video detection device 240 (e.g., using processor 320, input component 350, output component 360, and/or the like) can determine that no video data is included in the flow and end process 400. In some implementations, process 400 might not end at block 450, and video detection device 240 can perform an action based on the determination, such as identifying the flow as a non-video flow. Additional actions that can be performed by video detection device 240 are described in further detail with respect to block 460, below.

As further shown in FIG. 4, process 400 can include performing an action based on the determination that the at least one application data unit includes video data (block 460). For example, video detection device 240 (e.g., using processor 320, input component 350, output component 360, and/or the like) can perform an action based on the determination that the ADUs include video data. Video detection device 240 can perform a variety of actions. In some implementations, video detection device 240 can perform the actions and, in some implementations, video detection device 240 can cause another device to perform an action, such as one or more of the actions described below.

In some implementations, video detection device 240 can shape network traffic based on the determination that the ADUs include video data. For example, video detection device 240 can perform load balancing on the flow, and/or on other flows, based on the determination. As another example, video detection device 240 can alter a forwarding or routing port, path, and/or the like, based on the determination. As an additional example, video detection device 240 can change the manner in network traffic associated with the flow is queued, and/or which quality of service (QoS) is provided for network traffic associated with the flow.

In some implementations, video detection device 240 can log information associated with the ADUs based on the determination that the ADUs include video data. For example, information regarding the ADU throughput, size, and/or the like, can be stored in a log for future use (e.g., in performance of analytics, monitoring, and/or the like).

In some implementations, video detection device 240 can, based on the determination that the ADUs include video data, provide a third party device with information regarding the ADUs that include video data. For example, video detection device 240 can provide information regarding the ADUs to a logging device, a storage device, a network monitoring device, a network statistics device, a network analytics device, and/or the like.

While a variety of example actions are provided, above, other actions can also be performed, or caused to be performed, by video detection device 240. In this way, video detection device 240 can perform an action based on the determination that the ADUs include video data, enabling a variety of functionality that might not otherwise be possible, e.g., in a situation where network traffic is encrypted, new, unknown, or emerging network protocols are being used, and/or the like.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, video detection device 240 can be capable of identifying video data included in a variety of different types of network traffic, including encrypted network traffic and network traffic transmitted using a variety of different types of network transfer protocols. The ability to determine that network traffic includes video data can facilitate the performance of a variety of actions, such as network traffic shaping, network traffic statistics measuring, network traffic analytics, load balancing, and/or the like. In addition, the operations performed by video detection device 240 consumes relatively few computing resources, compared to other methods for identifying video content in network traffic, such as methods relying on machine learning, deep packet inspection, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memory devices; and
   one or more processors, communicatively connected to the one or more memory devices, to:
      identify a flow of network packets, the flow of network packets including:
         a plurality of uplink packets, and
         a plurality of downlink packets;
      determine that the flow of network packets includes at least one application data unit,
         each of the at least one application data unit including:
            an uplink packet from the plurality of uplink packets, and
            multiple downlink packets from the plurality of downlink packets;
      determine that the at least one application data unit includes video data,
         wherein, the one or more processors, when determining that the at least one application data unit includes the video data, are to:

determine that a throughput of the at least one application data unit meets a throughput threshold, determine that an average payload size of the multiple downlink packets included in the at least one application data unit meets a size threshold, and determine that a count of application data units included in the at least one application data unit meets a count threshold; and perform an action based on the at least one application data unit including the video data.

2. The device of claim 1, wherein the one or more processors, when determining that the flow of network packets includes the at least one application data unit, are to:

determine that a size of a payload included in the uplink packet meets a threshold uplink payload size; and determine that a size of a payload included in the multiple downlink packets meets a threshold downlink payload size.

3. The device of claim 1, wherein:

each of the plurality of uplink packets is encrypted; and each of the plurality of downlink packets is encrypted.

4. The device of claim 1, wherein the flow of network packets is transmitted using a Quick UDP Internet Connections (QUIC) protocol.

5. The device of claim 1, wherein the one or more processors, when performing the action based on the at least one application data unit including the video data, are to:

provide, to another device, information indicating that the at least one application data unit includes the video data.

6. The device of claim 1, wherein the one or more processors, when performing the action based on the at least one application data unit including the video data, are to:

shape subsequent network packets associated with the flow of network packets.

7. The device of claim 1, wherein the count threshold is three.

8. A non-transitory computer-readable medium storing instructions, the instructions comprising:

one or more instructions that, when executed by one or more processors, cause the one or more processors to:

identify a flow of network packets, the flow of network packets including:

a plurality of uplink packets, and a plurality of downlink packets;

determine that the flow of network packets includes at least one application data unit, each of the at least one application data unit including:

an uplink packet from the plurality of uplink packets, and multiple downlink packets from the plurality of downlink packets;

determine that the at least one application data unit includes video data, wherein the one or more instructions that cause the one more processors to determine that the at least one application data unit includes the video data, cause the one or more processors to:

determine that a throughput of the at least one application data unit meets a throughput threshold, determine that an average payload size of the multiple downlink packets included in the at least one application data unit meets a size threshold, and determine that a count of application data units included in the at least one application data unit meets a count threshold; and perform an action based on the at least one application data unit including the video data.

9. The non-transitory computer-readable medium of claim 8, wherein the one or more instructions that cause the one or more processors to determine that the flow of network packets includes the at least one application data unit, cause the one or more processors to:

determine that a size of a payload included in the uplink packet meets a threshold uplink payload size; and determine that a size of a payload included in the multiple downlink packets meets a threshold downlink payload size.

10. The non-transitory computer-readable medium of claim 8, wherein:

each of the plurality of uplink packets is encrypted; and each of the plurality of downlink packets is encrypted.

11. The non-transitory computer-readable medium of claim 8, wherein the flow of network packets is transmitted using a Quick UDP Internet Connections (QUIC) protocol.

12. The non-transitory computer-readable medium of claim 8, wherein the one or more instructions, that cause the one or more processors to perform the action based on the at least one application data unit including the video data, cause the one or more processors to:

provide, to a device, information indicating that the at least one application data unit includes the video data.

13. The non-transitory computer-readable medium of claim 8, wherein the one or more instructions, that cause the one or more processors to perform the action based on the at least one application data unit including the video data, cause the one or more processors to:

shape subsequent network packets associated with the flow of network packets.

14. The non-transitory computer-readable medium of claim 8, wherein the count threshold is three.

15. A method, comprising:

identifying, by a device, a flow of network packets, the flow of network packets including:

a plurality of uplink packets, and a plurality of downlink packets;

determining, by the device, that the flow of network packets includes at least one application data unit, each of the at least one application data unit including:

an uplink packet from the plurality of uplink packets, and multiple downlink packets from the plurality of downlink packets;

determining, by the device, that the at least one application data unit includes video data, wherein the determining that the at least one application data unit includes the video data comprises:

determining that a throughput of the at least one application data unit meets a throughput threshold, determining that an average payload size of the multiple downlink packets included in the at least one application data unit meets a size threshold, and determining that a count of application data units included in the at least one application data unit meets a count threshold; and performing, by the device, an action based on the at least one application data unit including the video data.

16. The method of claim 15, wherein determining that the flow of network packets includes the at least one application data unit comprises:
   determining that a size of a payload included in the uplink packet meets a threshold uplink payload size; and
   determining that a size of a payload included in the multiple downlink packets meets a threshold downlink payload size.

17. The method of claim 15, wherein:
   each of the plurality of uplink packets is encrypted; and
   each of the plurality of downlink packets is encrypted.

18. The method of claim 15, wherein the flow of network packets is transmitted using a Quick UDP Internet Connections (QUIC) protocol.

19. The method of claim 15, wherein performing the action based on the at least one application data unit including the video data comprises:
   providing, to another device, information indicating that the at least one application data unit includes the video data.

20. The method of claim 15, wherein performing the action based on the at least one application data unit including the video data comprises:
   shaping subsequent network packets associated with the flow of network packets.

* * * * *